United States Patent [19]

Detlefsen et al.

[11] Patent Number: 4,961,795
[45] Date of Patent: Oct. 9, 1990

[54] COMPOSITION AND PROCESS FOR BONDING LIGNOCELLULOSIC MATERIAL

[75] Inventors: William D. Detlefsen, Eugene; Earl K. Phillips, Springfield, both of Oreg.; Richard V. Norton, Wilmington, Del.

[73] Assignee: Borden, Inc., Columbus, Ohio

[21] Appl. No.: 149,102

[22] Filed: Jan. 27, 1988

Related U.S. Application Data

[63] Continuation-in-part of Ser. No. 145,639, Jan. 14, 1988, abandoned, which is a continuation of Ser. No. 903,253, Sep. 3, 1986, abandoned.

[51] Int. Cl.$^5$ .............................................. B32B 21/02
[52] U.S. Cl. ...................... 156/62.2; 156/307.7; 156/331.3; 156/335; 156/296; 525/480; 525/508; 528/142; 528/144; 528/137
[58] Field of Search .................. 156/62.2, 307.7, 315, 156/335, 331.3, 296; 428/326, 506, 529; 525/480, 501.5, 508; 528/144, 137, 142

[56] References Cited

U.S. PATENT DOCUMENTS

| | | | |
|---|---|---|---|
| 2,437,981 | 3/1948 | Stephan et al. | 528/142 X |
| 2,962,459 | 11/1960 | Ash et al. | 528/142 X |
| 3,562,060 | 2/1971 | Stevens | 156/335 |
| 3,599,433 | 8/1971 | Murata et al. | |
| 3,629,364 | 12/1971 | Soldatos . | |
| 3,639,658 | 2/1972 | Soldatos . | |
| 3,690,979 | 9/1972 | Jarui | 156/335 |
| 3,696,622 | 10/1972 | Tohma et al. . | |
| 3,878,021 | 4/1974 | Tiedeman | 156/331.3 |
| 3,880,694 | 4/1975 | Freeman et al. | 156/335 |
| 3,897,589 | 7/1975 | Meier | 156/335 |
| 3,929,695 | 12/1975 | Murata et al. | 156/335 |
| 3,933,936 | 1/1976 | Smith et al. | 156/335 |
| 3,949,149 | 4/1976 | Cherubin et al. | 428/529 |
| 3,968,294 | 7/1976 | Robitschek et al. | 428/529 |
| 4,109,057 | 8/1978 | Nakamura et al. | 428/529 |
| 4,175,065 | 11/1979 | Anderson | 156/335 |
| 4,240,948 | 12/1980 | Huck . | |
| 4,426,467 | 1/1984 | Quist et al. . | |
| 4,468,359 | 8/1984 | Lemon et al. . | |
| 4,474,904 | 10/1984 | Lemon et al. . | |

FOREIGN PATENT DOCUMENTS

| | | |
|---|---|---|
| 1065605 | 9/1959 | Fed. Rep. of Germany . |
| 1171606 | 12/1964 | Fed. Rep. of Germany . |
| 1653266 | 2/1972 | Fed. Rep. of Germany . |
| 2019854 | 11/1979 | United Kingdom . |

OTHER PUBLICATIONS

*The Merck Index*, 9th edition, 1976, p. 4096.

*Primary Examiner*—Merrell C. Cashion, Jr.
*Assistant Examiner*—Jeff H. Aftergut
*Attorney, Agent, or Firm*—Venable, Baetjer, Howard & Civiletti

[57] ABSTRACT

A composition and a process for bonding lignocellulosic material under heat and pressure is disclosed. According to the process, a curing agent is combined with a binder which is an alkaline phenol-formaldehyde resin. In one aspect the combination is by injection into a line carrying the binder to application apparatus, followed by in-line mixing of the curing agent and binder and application of the mixture to the lignocellulosic material. The lignocellulosic material is then compressed and the binder cured. The curing agent may be an ester, a lactone or an organic carbonate. The effect of the curing agent may be moderated with an aliphatic mono or polyhydric alcohol.

26 Claims, 1 Drawing Sheet

4,961,795

COMPOSITION AND PROCESS FOR BONDING LIGNOCELLULOSIC MATERIAL

RELATED APPLICATIONS

The present application is a continuation-in-part of an application Ser. No. 145,639 filed Jan. 14, 1988, now abandoned which was a file wrapper continuation of application Ser. No. 903,253 filed Sept. 3, 1986, now abandoned.

BACKGROUND OF THE INVENTION

1. Field of the Invention

The present invention relates to a process for bonding lignocellulosic materials such as in the manufacture of plywood, hardboard, particleboard, fiberboard, oriented strandboard and the like and compositions suitable for the practice of the process. More particularly, the process utilizes an ester, lactone or organic carbonate curing agent for phenolformaldehyde resins conventionally used in bonding lignocellulosic material. The curing agent may be injected into the resin and the two components mixed by a brief in-line mixing step.

2. Description of the Prior Art

Phenol-formaldehyde resins are widely used as adhesives and binders in many products, including structural wood products such as plywood, particleboard, fiberboard, hardboard and oriented strandboard. The productivity of most mills manufacturing structural wood products using liquid phenolformaldehyde resole (PF) binders is limited by the cure speed of the binder in the hot press. This is true because of the inherently slow thermal cure of these products, compared to other commonly used binders, and because of the need to eliminate moisture from the system during curing. It is known that PF resin cure can be accelerated by adding formaldehyde donors such as hexamethylenetetramine or via various organic and inorganic acids. These methods are not well suited to the current pruposes, however, because hexamethylenetetramine is relatively ineffectual with resoles, and acids cause problems with wood hydrolysis and corrosion of processing equipment and metal fasteners. In 1957 (DAS 1,065,605), Orth et al. disclosed that lactones could be used to harden PF binders suitable for wood gluing.

Plywood is a glued-wood panel that is composed of relatively thin layers, or plies, with the grain of adjacent layers at an angle to each other (usually 90°). The usual constructions have an odd number of plies to provide a balanced construction. If thick layers of wood are used as plies, often two corresponding layers with the grain directions parallel to each other are used; plywood that is so constructed often is called four-ply or six-ply. The outer pieces are faces or face and back plies, the inner plies are cores or centers, and the plies between the inner and outer plies are crossbands. The core may be veneer, lumber or particleboard, the total panel thickness typically being not less than one-eighth inch nor more than two inches.

In general, the plywood panels are dried to remove moisture to a level which is compatible with gluing. The panels are coated with a liquid glue, front and/or back as appropriate, with a glue spreader. Heat and pressure are applied in a hot press to cure the glue and bond the panels together to form the plywood.

Dry process composition board is a common form of composite panel. It may be made from wood fibers. In the manufacture of the board, raw wood is broken down to a fibrous form, sprayed with an appropriate adhesive, and then formed into a mat by a sifting or dry forming technique. This mat is then subjected to a high pressure and an elevated temperature to compact the mat to the desired density, commonly 40–60 lbs./ft.$^3$ In this hot pressing operation, the high temperature causes the resin to harden and to form an adhesive bond between the fibers.

In the preparation of particles used to make particleboard, a variety of materials may be employed. The board may be formed from a homogeneous type of particles. That is, all of the particles may be flakes, or all of them may be fibers. The board may be formed from a single layer or it may be multilayered, with fine surface flakes applied over a core of coarse flakes, or there may be a coarse flake core having an overlay of fibers on each of its surfaces. Other combinations are also used.

In the manufacture of particleboard, an aqueous solution of a synthetic resin binder is sprayed on the wood particles in an amount of from about 6 to about 10 parts of resin solids per 100 parts of dry wood. The resin-treated particles are then formed into a mat, and compacted in a hot press to the desired density. This type of panel is usually made to have a density in the range from about 35 lbs./ft.$^3$ to about 45 lbs./ft.$^3$ Typically, the thickness of particleboard would fall in the range from about one-eighth inch to two inches.

This type of process is quite versatile. Materials that would otherwise be waste materials can be formed into desirable products. For example, planer shavings can be formed into useful particleboard by this process, used alone, or in combination with other wood particles.

The mat process has been refined and improved, so that it is now common to make a multiple-ply board. For example, three forming heads may be used. Each head effects the placement of flakes, fibers or particles that have had resin and wax sprayed onto them, on a moving wire, or caul plate. The first forming head lays down a fine surface material, the second lays down a coarser material for the center layer of the board, and the third head lays down another outer layer of fine surface material.

In addition to the mat-forming hot pressing process, an extrusion process is now in use. In this process, a mixture of wood particles, resin and a wax size is forced through a die to make a flat board. The extrusion process is commonly used for captive production by companies which produce the resulting composite panel for use in furniture cores.

Some modern processes make use of a combination of press curing with hot platens and heat generated by radio frequency electricity. This combination permits rapid curing with a minimum press time.

While the dry process techniques for manufacturing composite panels are entirely dependent on synthetic resin adhesives, there are wet process techniques that can be used to make panels without any synthetic resin adhesive. However, often in actual practice the manufacturer of a wet process panel such as a hardboard will add a small amount of a synthetic resin binder in order to improve the properties of the product so that it can be used in demanding applictions. Often the proportion of resin binder used is on the order of one-tenth to one-twentieth of the proportion used in the dry process.

In the mat-forming stage of the wet process, a slurry of fibers is drained on a screen to form a wet mat. Often the mat is produced as an endless ribbon and cut into the desired panel size for curing.

In the manufacture of hardboard, the wet mat is treated somewhat differently than in the dry process. The wax emulsion, for example, is added in the wet end of the mat-forming machine. Enough emulsion, generally of paraffin wax, is used to add from about 0.3% to about 3.0% of wax to the fibers, dry basis. Similarly, when a resin binder is added in the wet process, it is generally added to the fiber slurry before the mat is formed. It may be precipitated onto the fibers by acidifying the slurry with alum.

Wet process techniques are often also used in the production of insulation board. This kind of product emphasizes a low density structure that combines thermal insulating and sound- absorbing properties in a composite panel type of product. With the addition of synthetic resins and other additives, properties such as surface quality, strength and moisture resistance of insulation boards can be improved.

SUMMARY OF THE INVENTION

The invention follows conventional practice in many respects concerning the manufacture of structural wood products. The present invention modifies conventional practice by accelerating the curing rate of the resin binder preferred by injecting a curing agent into the line carrying the resin binder to the applicator. The preferred injection step is followed by a brief in-line mixing of the curing agent and resin binder is performed and the mixture applied to the desired lignocellulosic material in a conventional manner. The lignocellu- losic material is then compressed and the binder cured. The curing agent may be a carboxylic acid ester, a lactone or an organic carbonate. The effect of this curing agent may conveniently be adjusted by combining a moderator with either the resin or the curing agent or by combining it with the mixture of both. The moderator may be an aliphatic alcohol. The binder resin, curing agent and moderator may be combined in such a way as to yield a composition which is stable at room temperature but displays accelerated curing at wood product consolidation temperatures.

DETAILED DESCRIPTION OF THE INVENTION

The present invention relates to the use of a mixture of a curing agent and a resin, referred to herein as an accelerated resin, for the bonding of lignocellulosic materials such as in the manufacture of plywood, hardboard, particleboard, fiberboard, oriented strandboard and the like. Phenol-formaldehyde resole resins are conventionally utilized in the manufacture of structural wood product, i.e., for the bonding of lignocellulosic materials. The phenol-formaldehyde resin may be unextended or extended. The unextended resins are typically used for the composition panels while the extended resins are used for plywood. The number average molecular weight of the conventional phenol- formaldehyde resins which may be utilized in the present invention is preferably greater than about 700, more preferably greater than about 1000, and most preferably within the range of about 1000–2200 for the composition panel with a special preference for weights between about 1000 and 1800. The resins used with plywood should also have molecular weights in excess of about 700, preferably weights between about 1350 and 3000, most preferably between about 1500 and 2500. The ratio of formaldehyde to phenol is preferably about 1.5:1 to 3.0:1. The resin solution has an alkalinity content, i.e., contains a base, in the range of 0.5% to about 15%, preferably 10% to 15%, more preferably 2% to 8%, based on the weight of the resin solution, when the base is sodium hydroxide. When a different base is utilized, the alkalinity content is proportionately equivalent. For example, if the base is potassium hydroxide, the alkalinity content would be about 0.71% to about 10.71%. As used herein, alkalinity content will mean percent of solution according to equivalent sodium hydroxide weight unless expressly stated according to base. For example, an alkalinity content of 6.4% KOH would be equivalent to an alkalinity content of about 9%, based on the equivalent weight of sodium hydroxide. Additional base can be added to a commercial resin to bring it to the desired concentration. The base may be an alkali metal or alkaline earth metal compound such as a hydroxide.

The curing agent for the phenol-formaldehyde resin has an ester functional group and may be selected from the group consisting of lactones, organic carbonates, carboxylic acid esters or mixtures thereof. Examples of suitable lactones include, but are not limited to, gamma-butyrolactone, beta-propiolactone, beta-butyrolactone, beta-isobutyrolactone, beta-isopentylactone, gamma-isopentylactone and delta-pentylactone. It is preferred to use gamma- butyrolactone. Examples of suitable organic carbonates include, but are not limited to, propylene carbonate, ethylene glycol carbonate, glycerol carbonate, 1,2-butanediol carbonate, 1,3-butanediol carbonate, 1,2-pentanediol carbonate and 1,3-pentanediol carbonate. If an organic carbonate is utilized, it is preferred to use propylene carbonate. Suitable carboxylic acid esters include, but are not limited to, methyl formate, methyl acetate, ethyl acetate, N-butyl acetate, butylene glycol diacetate, ethylene glycol diacetate and triacetin (glycerol triacetate). Other aliphatic monoesters could be used, such as $C_1-C_4$ alkyl propionate, $C_1-C_4$ alkyl formate, $C_1-C_4$ alkyl acetate, $C_1-C_4$ alkyl butyrate or $C_1-C_4$ alkyl pentanate. Additional aliphatic multiesters which could be used include ethylene glycol di-$C_1-C_5$ alkyl ester, diethylene glycol di-$C_1-C_4$ alkyl ester, propylene glycol di-$C_1-C_4$ alkyl ester, butylene glycol di-$C_1-C_4$ alkyl ester, glycerol $C_1-C_4$ alkyl ester, 1,3-propanediol $C_1-C_3$ alkyl ester, 1,3butanediol $C_1-C_2$ alkyl ester and 1,4-butanediol $C_1-C_2$ alkyl ester. Also, carboxylic acid esters from carbohydrate-based polyols and esters of dibasic carboxylic acids such as dimethyl oxalate and hydrolyzable polyesters could be used. If a mixture is utilized, it is preferred to use a mixture of gamma-butyrolactone and triacetin. Such a mixture could contain 50% by weight to 75% by weight of gamma-butyrolactone and 25% by weight to 50% by weight of triacetin. Generally, it is preferred to use a curing agent which contains 6 or 7 carbon atoms. However, the only requirement of the curing agent is that it must be dispersible in the resin and capable of remaining in suspension long enough to effect the curing of the resin. At least 1% by weight of resin solids of the curing agent is utilized. More preferably, the amount of curing agent is 1% by weight to about 20% by weight of resin solids, with about 3% by weight to about 7% by weight being most preferred. When expressed as moles of curing agent per gram of resin solids, between about 0.0001 and 0.004 mole of curing agent is used.

The curing agent can be combined with the resin as an undiluted substance or in a carrier. In the former case it should be a liquid at the temperature at which it is combined with the resin. In the latter case suitable diluents include the aliphatic alcohol moderators. However, environmentally objectionable carriers such as formaldehyde are not required and are not preferred.

The effect of the curing agent may be moderated with an aliphatic alcohol. The alcohol may be combined with the curing agent or the resin or it may be combined with an already formed mixture of the curing agent and resin. In the last case it is preferred that the moderator be added very shortly after the curing agent and the resin are combined. In the typical in-line injection situation it is advisable that some provision, such as a recirculation loop, be made so that accelerated resin is not held in the portion of the delivery lines before the entry point of the moderator during interruptions in operation. On the other hand, if the moderator is combined with the resin, it may be added to the reactants used to form the phenol- formaldehyde resole or it may be added to the synthesized B-stage resin.

The moderator may be used to modify an in-line injection procedure or it may be used to enable the packaging of the resin with the curing agent. In the former case the moderator provides more flexibility in the operation of the apparatus for applying the accelerated resin to the lignocellulosic material by providing more toleration for interruptions in the utilization of the accelerated resin such as shift changes or upsets in other parts of the wood products mill. In the latter case it may be used to provide an accelerated resin with a shelf life under ambient conditions of at least about one week, preferably of at least about three weeks. Such shelf stable accelerated resins still display substantially accelerated curing when subjected the evalated temperature conditions typically used to consolidate plywood or composite panel products.

The moderator may be any aliphatic alcohol, either monohydric or polyhydric, which is soluble in the total system. It is preferred that it be free of any functional groups other than hydroxyl groups which effect the final cure of the phenol-formaldehyde resin. The hydroxyl groups may be present at the time of addition or they may only form upon exposure to the aqueous alkaline solution of the resole resin. The key point is that hydroxyl groups be chemically available to exert their moderating effect on the accelerated resin. The lower equivalent weight alcohols are preferred since the hydroxyl groups are the effective agent and thus more effect is obtained per unit weight from such alcohols. The lower alkanols are particularly preferred. Among the suitable moderators are methanol, ethanol, n-propanol, isopropanol, butanol, ethylene glycol, propylene glycol, glycerine and triglycerol (an adduct of three moles of glycerine carrying 5 hydroxyl groups). The adducts of alkylene oxides such as ethylene or propylene oxide and an aliphatic alcohol are also suitable so long as they are soluble in the total system.

The moderator may be beneficially utilized at any amount which exerts a measurable effect upon the ambient condition curing rate of the accelerated resin. However, it is preferred to use an amount such that a substantial acceleration of curing is still observed under typical plywood or composition panel consolidation conditions and yet an amount sufficient to prevent premature gelling under the conditions of use. A molar ratio of curing agent to moderator of between about 1:3 and 3:1 has been found to be particularly advantageous for in-line utilization and a ratio between about 1:3 and 1:20 is preferred for prepackaged utilization.

The formulation of the phenol-formaldehyde resin depends to some extent on the end use for which it is intended and the formulation in turn effects the curing behavior of the resin and thus the result obtained from the curing agent and the moderator. The formulations typically used for composition panel such as oriented strandboard have a solids content of between about 50 and 60 weight percent and are free of any extender or filler. On the other hand, the formulations typically used for plywood are cooked to a solids content of between about 40 and 48 weight percent and then combined with a filler or extender such as the solid by-product obtained from the production of furfural alcohol from corn cobs or wheat flour.

The curing agent accelerated resin can be applied to the wood with any form of conventional equipment currently in use. Such equipment includes spray nozzles, atomizing wheels, roll coaters, curtin coaters and foam applicators. The key to successful use, however, lies in obtaining a relatively short time interval between mixing of the curing agent and the resin and application of the mixture to the wood. This is because the viscosity of the resin/curing agent mixture begins to rapidly increase and may result in loss of solubility in water and base immediately after mixing. When nest resins are mixed with the curing agent, as in an oriented strandboard application, the unmoderated mixture is usually too thick to handle within 30–60 minutes or less. The exact time depends upon the nature of the resin, the nature of the curing agent, and the proportions of the two components. When dealing with mixed adhesives, as in plywood, more pot life is available than with unfilled resins, usually about 60–180 minutes. This is true both because the mixed adhesives, normally mixtures of resin, water, sodium hydroxide and fillers or extenders do not increase as rapidly in viscosity as the neat resins and because plywood application equipment can handle higher viscosities. Despite the greater life of the plywood mixes, the rapid viscosity increase obtained when mixed in normal mixing equipment, i.e., mixing tanks, would be considered limiting. For these reasons, in-line mixing just prior to application to the wood is the preferred means of introducing the curing agent. In-line mixing is particularly advantageous in the use of the curing agent with unfilled phenolic and greatly facilitates use of the agent with filled resins. Small amounts of reclaimed resin/curing agent mixture can be mixed into a larger, unaccelerated resin reservoir without deleterious effects as long as the overall concentration of curing agent lies below the critical level.

The moderator may be utilized to either obtain more flexibility in the in-line mixing techniques or it may be used to make alternative mixing techniques practical. The time constraints, particularly in the high solids "neat" resins used for composition panel such as oriented strandboard, leave little margin for the errors and problems encountered in the environment of a wood products mill. For instance the metering of the in-line injection of curing agent may be imprecise because of equipment limitations or operator error. If an excessive amount of curing agent is injected the effect on the consolidation may be minimal because the minimum press cycle time becomes controlled by other factors once it has been reduced to a given minimum for a particular mill and a particular product. But the ability of the resin to tolerate extended residence time in the delivery system feeding the application apparatus is severly reduced. Thus if there is an interruption in the application of resin to the product being formed some of the resin in the delivery system may gel leading to build up and eventually line blockage. The moderator is particularly well suited to increasing the systems toleration for such increased levels of curing agent because it has a more dramatic effect on the ambient temperature curing than on the curing at typical press temperatures. For example in the production of ¾ inch oriented strandboard which is typically consolidated with a press platen temperature of 400° F. and a temperature at the core line where the accelerated resin is used of about 240° F. the pressing time is still shorter at about 410 seconds than typically mill conditions can utilize when sufficient moderator is present to obviate any line plugage problems.

On the other hand, the moderator may also be used to enable the production of storage stable total formulations, or the tank mixing of the curing agent and the resin. The former is obviously the most convenient for the wood products mill which then need not be concerned with any mixing procedure at all. The latter is less subject to errors and requires no additional equipment as compared to the in-line mixing technique. Thus the moderator can be used to substantially supress the room temperature activity of the curing agent without an objectionable loss to its high temperature activity.

Figure 1:
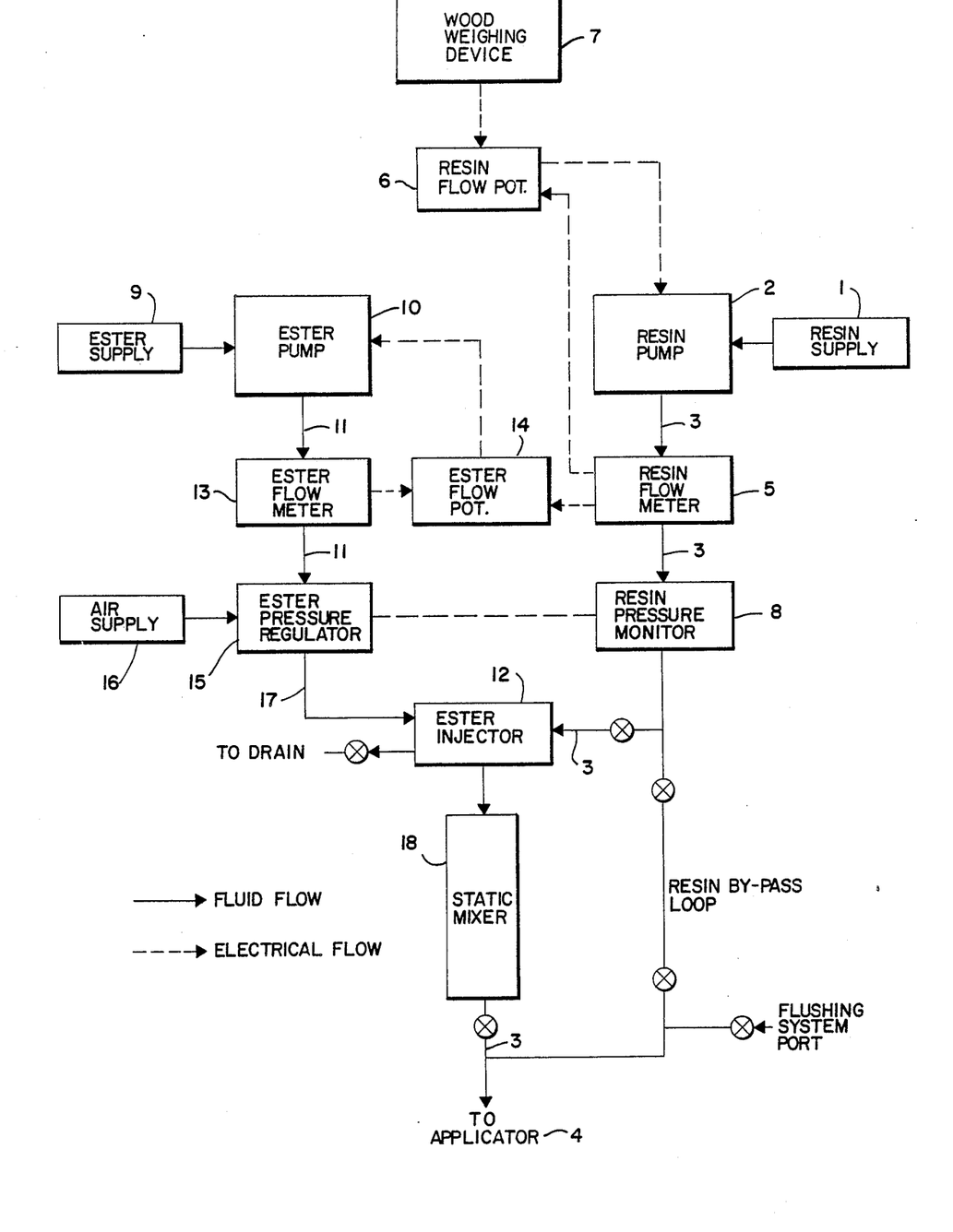
The FIGURE illustrates a representative schematic equipment diagram which can be utilized in the present process.

For the above reasons, the application equipment preferred for the unmoderated accelerated resins is an in-line mixing system. Such a mixing system includes an accurate curing agent metering pump which is slaved to the resin metering pump or wood metering belt, flow meters on both the curing agent and the resin systems, an injection port for introducing the curing agent to the resin line, a pressure regulator for keeping the curing agent line pressure above the resin line pressure, and a mixer, preferably a static mixer, immediately behind the curing agent injector. The system may also contain a flushing/purging system to facilitate cleanup. In a system handling such an unmoderated accelerated resin it is essential that the curing agent be introduced via a small diameter port and that the curing agent line pressure be maintained above the resin line pressure at all times in a closed system. If resin backs up into the curing agent line, plugging normally results. A needle valve or other positive cutoff valve is also useful to prevent plugging during non-operating intervals. A resin bypass is also desirable, to allow cleanup or changing of mixing equipment without blender down-time. One embodiment of a schematic equipment diagram useful in the present invention is shown in the drawing, where the curing agent is referred to as an ester.

The phenol-formaldehyde resin which contains the appropriate amount of base, which may be unextended or extended, and which may contain additional additives as desired, is pumped from a resin supply 1 via a resin pump 2 through a resin line 3 to the applicator 4, where it is applied to the lignocellulosic material. The flow of the resin is measured by the flow meter 5 and the amount of the resin pumped by the resin pump 2 is regulated by the resin flow potentiometer 6. The resin flow and the amount of wood from the wood weighing device 7 is imputted to the potentio- meter 6 to regulate the resin pump 2 so that a proper ratio of lignocellulosic material and resin is utilized. The pressure of the resin in resin line 3 is measured by a resin pressure monitor 8. Ester is pumped from an ester supply 9 via an ester pump 10 through an ester line 11 to an ester injector 12. The flow of the ester is measured by an ester flow meter 13 and the amount of ester pumped by the ester pump 10 is regulated by the ester flow potentiometer 14. The ester flow and resin flow are imputted to the ester flow potentiometer 14 to regulate the ester pump 10 so that the proper ratio of ester and resin is used. The pressure of the ester in ester line 11 is regulated by an ester pressure regulator 15 through the use of air from an air supply 16 with input from the resin pressure monitor 8 so that the ester line pressure in ester line 17 and in the ester injector 12 is greater than the resin line pressure in resin line 3. The ester is injected into the resin line 3 by the ester injector 12 and the ester/resin mixture immediately flows into a static mixer 18. The static mixer 18 has the same diameter as the resin line 3 and contains baffles for turbulent mixing. The mixture passes through static mixer 18 in a few seconds and proceeds to the applicator 4. The ester/resin mixture is applied to the lignocellulosic material by applicator 4 in a conventional manner according to the type of structural wood product being manufactured. The application of the mixture to the lignocellulosic material is performed immediately or fairly shortly after mixing.

For example when producing a composition panel such as particle board or oriented strandboard by the mat process wood flakes, fibers or particles are sprayed with a solution of resin. The sprayed pieces of wood may be passed through a forming head to make a mat. Alternatively, multiple forming heads may be employed to lay down successive layers of a multiple layer product. In such a case it is feasable to spray the wood particles being fed to each forming head with its own resin formulation. Thus accelerated resin can be utilized for the inner layer or layers and unaccelerated resin for the surface layers. For example, three forming heads may be used to produce three separate mats that can be juxtaposed for the production of a three-ply board, the two outer heads being used to put down a fine surface material, and the inner head being used to put down a coarser material for the center or core layer. Typically this is accomplished by having the forming heads positioned above a conveyor belt with the head depositing first layer being the furthest upstream and the head for each successive layer being downstream of the head depositing the previous layer. Naturally the first and last deposited layers form the two surfaces of the composite panel. In such a procedure it may be advantageous to only utilize an accelerated resin to coat the particles forming the middle or core layer. The surface layers already cure fairly rapdily because of their immediacy to the hot press plattens. In five or more layer compositions the intermediate layers may also cure sufficiently rapidly to make it beneficial to use accelerated resin solely in the core layer.

The choice of raw material for the lignocellulosic component is based mainly on availability and cost. As is common in boardmaking manufacturing operations, the wood from which particles are produced may be in the form of logs that are unsuitable for conversion into lumber or plywood because they are too small, too crooked or too knotty, or the like. When such logs are reduced to small particle form, defects are screened out.

The invention is useful in the production of board that is made from homogeneous lignocellulose material or from mixtures of different kinds of such material. A board may be made, for example, completely from wood particles, or completely from wood flakes, or from fibers, planer shavings or the like, or from mixtures of these. Similarly, a board may be formed with multiple layers, with fine surface flakes and a core of coarse flakes, or it may have a coarse-flaked core with an overlay of fibers on each of its surfaces. Other combinations may also be produced.

Wood flakes are generally made by a machine that shaves off flakes of the wood in a direction such that the length of each flake is parallel to the wood grain. A normal size flake has dimensions such as ¼ by 1", with a thickness in the range from about 0.005" to about 0.075", depending upon the intended end use.

The cellulosic material may also be in the form of wood fibers. In the production of such fibers, wood chips are generally mechanically reduced to fiber form in an attrition mill. The fibers so produced are generally placed in the form of a pulp or water slurry containing from about 1% by weight to 2% by weight of fiber. While chemical binders may sometimes be omitted in the production of composition panels from fibers, when a resin binder of the phenol-formaldehyde type is employed, the present invention is useful.

The wood pieces employed in making the composite panel have some affinity for water and a tendency to absorb it. Water entering a composite panel tends to weaken it, may cause some swelling of surface fibers, and increases the dimensional instability of the composition panel. To prevent this tendency to absorb water, a wax may be applied to the wood pieces to provide a built-in resistance in the composition panel to water absorption. The wax employed may be any wax that will suffice, for example, a crude scale wax or a microcrystalline wax. It is applied, generally, at a rate of from about 10% by weight to about 30% by weight of the binder, and preferably about 20% by weight, dry solids basis. When expressed in terms of oven-dried furnish solids, the amount of wax is from about 0.3% by weight to about 3.0% by weight of wax to wood.

The amount of phenol-formaldehyde resin used generally will depend upon the characteristics required in the final product. For a high-grade insulation board, the amount of binder used may be up to about 5% of resin solids based on dry finished board weight, and generally may be from about 2% to about 4%. For a good grade of particleboard, the amount of resin should be sufficient to provide from about 3% to about 8% dry resin solids based on the weight of the furnish for the composite panel. In a multi-layered board, a lesser amount of resin will often be used in the core than is used for the surface layers, such as, for example, 3% of resin solids for the core, and 8% of resin solids in the two surface layers. The added amount of resin in the surface layers imparts added strength and hardness as compared to the core. More resin than 8% can be used, but a greater amount presently is not cost-efficient.

Hot pressing conditions will depend upon the thickness of the board as well as on resin characteristics. A representative press cycle for the production of a ¾" thick phenolic bonded particle-board would be about 7-10 minutes at a press platen temperature of about 380°-420° F. The pressing time can be reduced by the present invention without loss in board quality. For instance ¾ inch five layer oriented strandboard typically requires a pressing time of 540 seconds. The use of about 5 weight percent of a curing agent such as propylene carbonate allows reduction of the press time to as little as 410 seconds without loss of final board properties even if a moderator, such as propylene glycol, is used in a weight ratio of 3 parts to one part of curing agent.

The invention is also useful in the manufacture of plywood, a board composed of multiple layers of wood veneers. The veneers are usually arranged so that the wood grain direction is perpendicular in adjacent veneers.

The plywood process requires straight logs cut to length, and conditioned in heated vats containing water and surfactants to increase the heating efficiency of the vats. The heated logs are then "peeled" wherein a veneer of predetermined thickness is removed continuously until the log diameter is reduced to a certain point, usually 5-8 inches. The veneer is then clipped into strips, sorted and dried to a moisture content of 15% or less.

After drying, the veneers are graded and assembled into plywood panels. the adhesive is applied to the veneers at this stage of manufacture. The adhesive is usually composed of phenol-formaldehyde resin, water, a basic material such as sodium hydroxide, and fillers that include inorganic and organic flours, such as wheat flours, wood flours, and clays. The adhesives are especially formulated for individual user mills depending on manufacturing equipment, type of wood to be glued, type of product to be made, and ambient environment conditions at the time of panel manufacture. The adhesive is usually applied to the veneers by roll coater, curtain coater, sprayline or foam extruder. The adhesive usually contains phenol-formaldehyde resin at a level of 20%-40% resin solids by weight. The adhesive is normally used with spread levels of 50 lbs.-110 lbs. of adhesive per 1000 square feet of gluelines, when the veneer is spread on both sides, or 25 lbs.-55 lbs., when spread on one side.

After the adhesive is applied to the wood veneers and the panels are assembled, they are consolidated under heat and pressure. This is usually done in a steam hot-press using platen temperatures of 240°-350° F. and pressures of 74-250 psi.

In producing plywood, the most critical glueline is the innermost one. This glueline is the most difficult to cure under present conditions. That is, often the innermost glueline is not fully cured when the other gluelines are. It is necessary, then, to apply additional hot pressing to the board to cure this glueline. One additional use of the present invention is that the accelerated resin can be applied to the innermost glueline and a conventional resin applied at the other gluelines. The accelerated resin is then able to provide a complete cure at the innermost glueline in the same time period as it takes to cure the other gluelines.

It has been discovered that several advantages are obtained by utilizing an accelerated resin, i.e., a resin containing the curing agent, in the manufacture of structural wood products. One advantage is that cure time can be descreased. For example, in the preparation of ¾" oriented strandboard a 540 sec. cycle (press and heat) is utilized when the resin is an unaccelerated resin. The time can be reduced to a 490 sec. cycle with an accelerated resin, having a gamma-butyrolactone content of about 5%, without loss in durability and other important properties. A second, significant advantage is that the addition of the curing agent increases the tolerance to moisture in the system. Thus, in the preceding example, the wood could have a 3% higher moisture content before blending than in a system which lacked the curing agent. Even when a higher moisture content is used, no blows result, and board properties such as thickness, swell and durability are good. After pressing and heating, i.e., curing the resin, the moisture content of the product is also generally higher. It is not uncommon to obtain a 2.7% to 3.0% moisture content in the ¾" strandboard. This advantage is also significant, since the strandboard will not pick up as much moisture later, causing fewer buckling problems. Since the system can withstand more moisture with the accelerated resins, it is possible to produce more premium-grade panels. It has been found that the thicker the board, the more effective the accelerator, and the more significant the advantages.

The invention will be demonstrated by the following examples. In these examples and elsewhere through the specification, parts and percentages are by weight and temperatures are degrees Celsius unless expressly indicated otherwise. The term "molar ratio" refers to the molar ratio of formaldehyde to phenol unless indicated otherwise.

EXAMPLE 1

Curing of the phenol-formaldehyde copolymers is the result of molecular weight increases which have been carried past some critical point at which a rigid, three-dimensional matrix is formed. It is obvious that any material which causes a rapid increase in molecular weight will accelerate cure. An increase in molecular weight is also generally accompanied by an increase in resin viscosity and a loss in solubility, although the converse is not necessarily true. In this example, the effects of the concentration of ester on the rate of molecular weight development are shown. It is also shown that the increases in viscosity relate to the molecular weight increases observed.

A commercial 50% solids, sodium hydroxide catalyzed resole (wherein alkalinity is 4.0%, number average molecular weight is 1329, viscosity is 3500 cps at 25° C., and molar rato is 2.2) containing a small amount of ammonia was mixed with various amounts of gamma-butyrolactone as in Table I. Samples of the mixture were taken after various times at 35° C. and size exclusion chromatography (SEG) molecular weight and 25° C. Brookfield (model No. RVF) viscosity were checked. Results are shown in Table I.

TABLE I

The Effects of Ester Concentration on Molecular Weight and Viscosity Increase

| Grams of Ester on 400 g Resin | 0 Min. | | 5 Min. | | 10 Min. | | 20 Min. | |
|---|---|---|---|---|---|---|---|---|
| | MW. | Visc. | MW. | Visc. | MW. | Visc. | MW. | Visc. |
| 5.68 | 1329 | 1800 | 1352 | 2350 | 1374 | 3000 | 1420 | 4400 |
| 11.42 | 1329 | 1200 | 1362 | 1800 | 1395 | 3000 | 1461 | 5750 |
| 28.58 | 1329 | <2000 | 1448 | 5000 | 1566 | 105000 | — | gel |
| 34.29 | 1329 | <2000 | 1445 | 5400 | 1560 | 200000 | — | gel |
| 40.00 | 1329 | <2000 | 1536 | 6700 | — | near gel | — | gel |

The ester reduced initial viscosities slightly. The ester also seems to insolubilize this resin in proportion to the amount used. This has secondary effects on viscosity. Thus, viscosities are comparable within ester levels, but not between them.

EXAMPLE 2

In order to be effective as an adhesive for many wood products, it is important for economic and handling considerations that the rate of cure be accelerated by heat. In this example, it is shown that phenol-formaldehyde resins containing ester are still accelerated by heat, thus an amount of ester less than that required for ambient cure can be used to assist cure at the normally elevated temperatures seen in oriented strandboard, hardboard, particleboard, or plywood production. The resin utilized was Casacophen 502 (Borden Chemical Company), and 8.57 parts of gamma-butyrolactone per 100 parts of resin solids was used. The acceleration, i.e., increase in molecular weight, by heat is shown in Table II.

TABLE II

The Effects of Temperature on Molecular Weight Increase Rate at Fixed Ester Concentration

| Temp. (°C.) | Number Average Molecular Weight at Times (min) | | | | | | | |
|---|---|---|---|---|---|---|---|---|
| | 0 | 2 | 3 | 4 | 5 | 7 | 8 | 12 |
| 45 | 1367 | — | — | 1544 | — | — | 1672 | 1741 |
| 63 | 1367 | — | 1713 | — | 1831 | 1911 | — | — |
| 80 | 1367 | 1820 | 1982 | 2033 | — | — | — | — |

Gel time is also generally accepted as an indication of cure speed. Table III shows the effects of temperature on gel time at various levels of gamma-butyrolactone.

TABLE III

The Effects of Temperature on Gel Time at Various Ester Levels

| Ester Level (pts/100 pts Resin Solids) | Temperature (°C.) | Gel Time (Minutes) |
|---|---|---|
| 8.7 | 25 | 58.1 |
| | 50 | 14.0 |
| | 75 | 3.4 |
| 34.8 | 25 | 11.1 |
| | 50 | 2.7 |
| | 75 | 0.6 |
| 69.6 | 25 | 6.4 |
| | 50 | 1.9 |
| | 75 | 0.6 |

EXAMPLE 3

Examples 1 and 2 indicate accelerating effects on a sodium hydroxide catalyzed system. This example illustrates the use of other bases, particularly potassium hydroxide. Example 1 demonstrates that viscosity increases were indications of molecular weight development. That fact is used in this example to demonstrate acceleration.

In this example, a laboratory resin was prepared at 57% solids, a molar ratio of 2.5, 6.4% potassium hydroxide catalyst (i.e., alkalinity content of 6.4% KOH), a number average molecular weight around 1200, and containing urea. This resin was mixed with five parts of triacetin on 100 parts of resin solids. Table IV shows the advancement in terms of viscosity increase at 23° C.

TABLE IV

The Accelerating Effects of Triacetin on Potassium Hydroxide Catalyzed Resin

| Time (Minutes) | Brookfield Viscosity (cps) |
|---|---|
| 0 | 168 |
| 30 | 648 |
| 60 | 1820 |
| 90 | 3890 |
| 120 | 6460 |
| 155 | 10580 |
| 352 | 26520 |

EXAMPLE 4

In this example a laboratory resin was prepared at 50% solids, with a 2.2 molar ratio, 6.0% sodium hydroxide, and treated with various esters. Gel times at room temperature (≅25° C.) were recorded.

TABLE V

Effects of Various Ester Types on the Gel Time of PF Resin

| Ester Used | Parts Ester Per 100 parts Resin Solids | Gel Time (Minutes) |
|---|---|---|
| Gamma-butyrolactone | 16 | 12 |
| | 18 | 10 |
| | 20 | 9 |
| Triacetin | 16 | 38 |
| | 18 | 36 |
| | 20 | 30 |
| Propylene Carbonate | 16 | 12 |
| | 18 | 7 |
| | 20 | 6 |

EXAMPLE 5

In this example, a low alkalinity (pH=9), commercial hardboard resin was treated with 10% methylformate at room temperature. The mixture gelled in three minutes.

EXAMPLE 6

A laboratory resin at a formaldehyde:phenol molar ratio of 3.0:1.0, an alkalinity content of 15% on solution weight of NaOH, and 40% solids was mixed with n-butylacetate at 50% ester on resin solids. Gelation occurred at room temperature after 164 minutes.

EXAMPLE 7

In this example, laboratory aspen strandboards were manufactured as shown in Table VI with a commerical strandboard resin, Cascophen PC16 (Borden Chemical Company). The resin was treated with varyiing amounts of gamma-butyrolactone and sodium hydroxide prior to application to the wood. Improvements in cure speed were observed as indicated by the internal bond (IB) development in pressing time (Table VII).

TABLE VI

Board Manufacturing Conditions

| | |
|---|---|
| Thickness | 0.75" |
| Density | 40 lbs./ft.$^3$ |
| Resin Content | 5% solids on O.D. wood |
| Wax Content | 1% solids on O.D. wood |
| Resin Application | Air Atomized Spray |
| Press Temperature | 400° F. |
| Press Times | Corner delams plus two minutes at 30 sec. intervals |

TABLE VII

| Ester Level (Parts/ 100 parts Resin) | Alkalinity Level (Parts/ 100 parts Resin) | Board Properties IB at Press Times (min) of: | | | | | |
|---|---|---|---|---|---|---|---|
| | | 6.0 | 6.5 | 7.0 | 7.5 | 8.0 | 8.5 |
| 0 | normal | — | — | D | 34 | 49 | 56 |
| 4 | normal | — | D | 49 | 48 | 56 | — |
| 8 | normal | D | 42 | 47 | 56 | — | — |
| 0 | +2 | — | — | D | 45 | 61 | 53 |
| 4 | +2 | — | D | 36 | 42 | 49 | — |
| 8 | +2 | D | 44 | 51 | 54 | — | — |
| 0 | +6 | — | — | D | 40 | 54 | 52 |
| 4 | +6 | — | D | 62 | 60 | 56 | — |
| 8 | +6 | 49 | 61 | 58 | — | — | — |

EXAMPLE 8

Laboratory plywood was manufactured using Southern pine veneer, a commercial southern pine plywood resin, Cascophen SP5520D (Borden Chemical Company), and conditions as indicated in Table VIII. The curing boards are broken and the number of wood breaks and the number of glueline breaks are noted. A higher percent wood failure indicates better gluing of the plywood. Results are shown in Table IX.

TABLE VIII

Plywood Gluing Conditions

| | |
|---|---|
| Thickness | ⅜" |
| Plies | 5 |
| Press Temperature | 300° F. |
| Assembly Time | 20 min. |
| Glue Spread | 80-85 lbs./MDGL* |
| Mix Solids | 58% |
| Resin Solids in Mix | 28.5% |
| Mix Viscosity | 2000-4000 cps |
| Applicator | roll coater |

*MDGL means 1000 square feet of double glue line.

TABLE IX

Gluing Results

| Ester Level (pts/100 pts Resin Solids) | Pressing Time (Minutes) | Percent Wood Failure (PS 1-83) |
|---|---|---|
| 0 | 4.5 | 19 |
| | 5.0 | 46 |
| | 5.5 | 85 |
| 5 | 4.5 | 40 |
| | 5.0 | 76 |
| | 5.5 | 85 |

EXAMPLE 9

Oriented strandboard was manufactured using a commercial strandboard resin, Cascophen PC16 (Borden Chemical Company) applied at 50% resin solids, with or without gamma-butyrolactone and under the conditions as indicated in Table X. The results are shown in Table XI. The minimum cure time observed for 0.75 inch strandboard with an unaccelerated resin was 520 sec. to produce strandboard without a significant number of blows. In Table XI, PL refers to parallel and PD to perpendicular.

TABLE X

Board Manufacturing Conditions

| | |
|---|---|
| Thickness | 0.75", 0.625", 0.50" |
| Density | 40 lbs./ft.$^3$ |
| Resin Content | 5% solids on O.D. wood |

TABLE X-continued

Board Manufacturing Conditions

| Ester Content | 5% on resin solids |
|---|---|
| (when present) Wax Content | 1% solids on O.D. wood |
| Resin Application | Air Atomized Spray |
| Press Temperature | 400° F. |

TABLE XI

Board Properties

A. 0.75"

| | Cure Time (sec) | | | |
|---|---|---|---|---|
| | 450 w/accel. | 460 w/accel. | 520 wo/accel. | 470 w/accel. |
| IB % Retained | 44 | 52 | 53 | 48 |
| PL | 54 | 53 | 64.0 | 68.0 |
| PD | 49 | 52 | 58.0 | 64 |
| TS | 8.5 | 6.2 | 9.4 | 11.0 |
| MC | 2.7 | 2.3 | 1.6 | 1.9 |

B. 0.625"

| | Cure Time (sec) | | |
|---|---|---|---|
| | 370 w/accel. | 380 w/accel. | 400 wo/accel. |
| IB % Retained | 39.4 | 44 | 39 |
| PL | 67.9 | 63.3 | 59.3 |
| PD | 56.4 | 71.7 | 58.9 |
| TS | 13.2 | 9.4 | 27.5 |
| MC | 1.9 | 1.6 | 1.7 |

C. 0.5"

| | Cure Time (sec) | |
|---|---|---|
| | 300 w/accel. | 330 wo/accel. |
| IB % Retained | 47 | 48 |
| PL | 56 | 67 |
| PD | 65 | 77 |
| TS | 10.5 | 11.2 |
| MC | 1.5 | 1.5 |

EXAMPLE 10

Plywood was manufactured using a commercial plywood resin Cascophen SP5520D (Borden Chemical Company), with and without 5% gamma butyrolactone (GB). The resin was modified by adding 4.5% KOH. The conditions and results expressed as percent wood failures are shown in Table XII.

TABLE XII

| Resin System | Assembly Time[1] | | | | Pressing Time[2] | | | Average[5] Across Conditions |
|---|---|---|---|---|---|---|---|---|
| | 10' | 20' | 40' | 80' | 4.5' | 5.0' | 5.5' | |
| A. Fresh Mixes | | | | | | | | |
| Control - SP5520D | 41 | 94 | 98 | 94 | 56 | 1[3] | 34[3] | 70 ± 29 |
| SP5520D & 5% GB | 85 | 85 | 54 | 79 | 84 | 25[3] | 87 | 71 ± 23 |
| KOH Modified | 81 | 89 | 96 | 73 | 81 | 79 | 100 | 86 ± 10 |
| B. Repeat of Press Time Series[4] | | | | | | | | |
| Control - SP55220D | — | — | — | — | 19 | 46 | 85 | 50 ± 33 |
| SP5520D & 5% GB | — | — | — | — | 40 | 76 | 85 | 67 ± 24 |
| KOH Modified | — | — | — | — | 53 | 92 | 95 | 80 ± 23 |
| KOH & 5% GB | — | — | — | — | 18 | 79 | 81 | 59 ± 36 |
| C. Gluing With Aged Mixes (24 hours) | | | | | | | | |
| Control - SP 5520D[6] | — | — | — | — | 50 | 74 | 50 | 58 ± 14 |
| SP5520D & 5% GB | — | — | — | — | 78 | 80 | 81 | 80 ± 2 |

[1] ⅜", 3 ply, 80-85 #/MDGL, 3 min. @ 300° F.
[2] ⅝", 5 ply, 80-85 #/MDGL, 20' A.T., 300° F.
[3] Equipment related pressing problem.
[4] 20' A.T., same conditions as in Note 2 after fixing press.
[5] Mean and standard deviation.
[6] Fresh mixes are 28.5% resin solids, 58% mix solids, viscosity of 2000-4000 cps. After 24 hours, the control mix was 4700 cps and the GB mix was 14,500 cps.

EXAMPLE 11

A series of three resins were synthesized to investigate the moderation effects of aliphatic alcohols. In each case the phenol and formaldehyde were added to the reaction vessel and the reaction temperature was stabilized at 60° C. The caustic was then added and the reaction temperature was stabilized at 95° C. followed by cooling back to 85° C. for the balance of the reaction. In each case the reaction was terminated by further cooling once a target viscosity was achieved. The reactions took between about 3.5 and 4 hours. In the case of Resins 1 and 3 the ethylene glycol was included in the initial charge and in the case of Resin 2 it was added at the end of the reaction. The formulations of the resins in weight percent and the synthesized properties were as follows:

TABLE XIII

| Component Identity and Properties | Resin 1 | Resin 2 | Resin 3 |
|---|---|---|---|
| Phenol (as 100% A.I.) | 29.87 | 29.87 | 36.13 |
| CH$_2$O (as 50% aqueous solution) | 47.65 | 47.65 | 57.63 |
| H$_2$O (deliberately added and from phenol | 13.26 | 13.26 | |
| Ethylene Glycol | 7.68 | 7.68 | 4.37 |
| Caustic (as 50% aqueous solution) | 1.54 | 1.54 | 1.87 |
| Brookfield 20° C. viscosity in cps | 247 at 20 rpm | 289 at 100 rpm | 240 at 20 rpm |
| Alkalinity in weight percent | 0.76 | 0.75 | 0.92 |
| Solids in weight percent | 50.79 | 51.16 | 57.82 |
| Free CH$_2$O | 3.75 | 3.70 | 3.62 |
| pH | 8.45 | 8.26 | 8.38 |

These resins were then combined with various amounts of accelerators and, in some cases, further moderator and the time until the solution separated into two distinct components during storage at room temperature was noted. The results are as follows:

TABLE XIV

| Accelerator | | Additional Moderator | | Resin Life Time | | |
|---|---|---|---|---|---|---|
| Identity | Amount (parts per hundred) | Identity | Amounts (parts per hundred) | Resin 1 | Resin 2 | Resin 3 |
| gamma butyrolactone | 1 | — | — | — | — | 1 day |
| | 2 | — | — | 82 minutes | — | 319 minutes |
| | 8 | — | — | 90 minutes | — | — |
| triacetin | 1 | — | — | — | — | 2 days |
| | 2 | — | — | — | — | 1 day |
| propylene glycol | 1 | — | — | 94 minutes | 81 minutes | 14 days |
| | 2 | — | — | — | — | 407 minutes |
| | 2 | ethylene glycol | 8 | 135 minutes | 131 minutes | >5 days |
| | 2 | ethylene glycol | 11 | 269 minutes | — | — |
| | 2 | ethylene glycol | 14 | 1-3 days | — | — |
| | 2 | ethylene glycol | 17 | 1-3 days | — | — |
| | 2 | ethylene glycol | 20 | 1-3 days | — | — |
| | 2 | ethylene glycol | 23 | 4 days | — | — |
| | 2 | ethylene glycol | 26 | 7 days | — | — |
| | 2 | ethylene glycol | 29 | 11 days | — | — |
| | 2 | isopropyl alcohol | 2 | 68 minutes | — | — |
| | 2 | isopropyl alcohol | 4 | 129 minutes | — | — |
| | 2 | isopropyl alcohol | 8 | >1 day | — | >1 day |
| | 2 | triglycerol | 8 | — | — | >1 day |
| | 2 | methanol | 8 | — | — | >1 day |
| | 8 | — | — | 53 minutes | — | — |

The three resins showed increased resistance to separation even without additional moderator and the addition of further moderator further enhanced this resistance.

EXAMPLE 12

A phenol-formaldehyde resin was synthesized in a manner similar to that used in Example 11 using a formaldehyde to phenol ratio of 2.5 and sufficient sodium hydroxide to give an alkalinity content of about 4 weight percent. The resin had a solids content of about 57%, a 25° C. 20 rpm Brookfield viscosity of about 200 cps and a number average molecular weight of approximately 1200.

This aqueous alkaline resin solution was combined with 10 parts of propylene carbonate per 100 parts of solution and various amounts of propylene glycol and the time to gel at 25° C. was observed as follows:

| Premix Ratio (percentage) | | Parts of Permix (per 100 parts of solution) | Geltime at 25° C. (in seconds) |
|---|---|---|---|
| Carbonate | Glycol | | |
| 100 | 0 | 10.0 | 80 |
| 75 | 25 | 13.3 | 90 |
| 50 | 50 | 20.0 | 110 |
| 25 | 75 | 40.0 | 192 |

The level of accelerator (carbonate) was substantially greater than that suitable for convenient practical use in order to obtain a more immediate measure of the effects involved. A more typical level for practical application of a 57% solids resin would be about 4% based on the total solution (7% on resin solids ×57% resin solids). At this lower level gel times suitable for application in a wood products mill are obtained.

EXAMPLE 13

The resin solution described in Example 12 was utilized in the production of five layer ¾ inch oriented strandboard in a commercial wood products mill. A combination of propylene carbonate and propylene glycol in a 3:1 weight ratio was added to the delivery line carrying the resin solution to the application apparatus at a rate of 12 weight percent based on resin solids (6.8% based on the total solution. The accelerated resin solution or binder) adequately cured with a press time of 410 seconds at about 400° F. when used for the core (center) layer of the five layer composite although other mill conditions made it convenient to run with a press time of between about 450 and 480 seconds. The same binder without accelerator required a press time of about 540 seconds to obtain acceptable final product properties. The mill made this product more or less continuously for a period of five days during which several interruptions in the application of the accelerated binder to the constituent strand forming the strandboard. However, no line plugging occurred during these periods when accelerated binder was held in the delivery system. At the conclusion of the run no significant build up of cured resin was found in the delivery system or the application apparatus.

This same mill had previously used the same binder with in-line injected propylene carbonate curing agent but without the propylene glycol moderator for the core layer of the same product. During this previous usage this mill had experienced substantial problems with line pluggage and the build up of cured resin in the delivery system and application apparatus.

While the invention has been described in connection with specific embodiments thereof, it will be understood that it is capable of further modifications. This application is intended to cover any variations, uses or adaptations of the invention following, in general, the principles of the invention, and including such departures from the present disclosure as come within known and customary practice within the art to which the invention pertains.

What is claimed is:

1. In a process of bonding lignocellulosic material by combining it with a binder which is essentially free of formaldehyde and which comprises an aqueous alkali solution of a phenol-formaldehyde resin synthesized from phenol and formaldehyde in a molar ratio between about 1:1.5 and 1:3 to have a number average molecular weight between about 700 and 3000 and which has a sodium hydroxide equivalent weight alkalinity of between about 0.5 and 15 weight percent, based on the weight of the binder, and curing the binder with the application of heat and pressure, the improvement comprising modifying the curing behavior of the binder by combining it with an accelerator selected from the group consisting of carboxylic acid esters, lactones, organic carbonates and mixtures thereof and with between about ⅓ and twenty moles per mole of accelerator of a moderator which comprises an aliphatic alcohol.

2. In the process of claim 1 the further improvement wherein the molar ratio of accelerator to moderator is between about 1:3 and 3:1 and the accelerator content is at least about 1 weight percent, based on the resin solids of the binder.

3. In the process of claim 1 the further improvement wherein the moderator is combined with either the binder or the accelerator before the accelerator is combined with the binder.

4. In the process of claim 3 the further improvement wherein the moderator is combined with the binder first.

5. In the process of claim 4 the further improvement wherein the moderator is combined with the components of the binder before they are fully reacted to form the binder resin.

6. In the process of claim 3 the further improvement wherein the moderator is combined with the accelerator first.

7. In the process of claim 4 or 6 the further improvement wherein the molar ratio of accelerator is between about 1:3 and 3:1.

8. In the process of claim 1, 2 or 3 the further improvement wherein the moderator is a mono or polyhydric alkanol or ether alkanol.

9. In the process of claim 8 the further improvement wherein the moderator is selected from the group consisting of methanol, ethanol, n-propanol, isopropanol, butanol, ethylene glycol, propylene glycol, glycerine and triglycerol.

10. The process of claim 1 wherein the moderator is not combined with the binder until after the binder is synthesized.

11. The process of claim 5 wherein the moderator is selected from the group consisting of butanol, ethylene glycol, propylene glycol, glycerine, triglycerol and mixtures thereof.

12. In a process of bonding lignocellulosic material by combining it with a binder which is essentially free of formaldehyde and which comprises an aqueous alkali solution of a phenol-formaldehyde resin synthesized from phenol and formaldehyde in a molar ratio between about 1:1.15 and 1:3 to have a number average molecular weight between about 1000 and 2500 and which has a sodium hydroxide equivalent weight alkalinity content of between about 0.5 and 8 weight percent, based on the weight of the binder, and curing the binder with the application of heat and pressure, the improvement comprising modifying the curing behavior of the binder by combining it with between about 3 and 7 weight percent, based on the resin solids of the binder, of an accelerator selected from the group consisting of carboxylic acid esters, lactones, organic carbonates and mixtures thereof and with between about ⅓ and twenty moles per mole of accelerator of an aliphatic alcohol moderator.

13. In the process of claim 12 the further improvement wherein the accelerator is combined with the binder by injection into the delivery lines carrying the binder to the apparatus for applying the binder to the lignocellulosic material followed by mixing in this delivery system and the mole ratio of moderator to accelerator is between about 1:1 and 3:1.

14. The process of claim 12 wherein the lignocellulosic material is wood pieces being consolidated into composition panel and the binder is free of both extender and filler.

15. The process of claim 14 wherein the wood pieces are strands or flakes being consolidated into oriented strandboard.

16. The process of claim 14 or 15 wherein the binder has a resin solids content of between about 50 and 60 weight percent.

17. The process of claim 13 or claim 15 wherein the moderator is not combined with the binder until after the binder is synthesized.

18. A composition for the bonding of lignocellulosic material which is essentially free of formaldehyde comprising:

an aqueous alkali solution of a phenol-formaldehyde resin synthesized from phenol and formaldehyde in a molar ratio of between about 1:1.15 and 1:3 to have a number average molecular weight of at least about 700 and which has a sodium hydroxide equivalent weight alkalinity of between about 0.5 and 15 weight percent, based on the weight of the composition;

an amount of a curing agent selected from the group consisting of carboxylic acid esters, lactones, organic carbonates and mixtures thereof effective to accelerate the curing of the pheno-formaldehyde resin; and an amount between about ⅓ and twenty moles per mole of accelerator of a moderator selected from monohydric or polyhydric aliphatic alcohols soluble in the aqueous alkaline solution effective to slow down the room temperature curing rate of the composition while still allowing it to display an accelerated cure rate at the elevated temperatures used to consolidate wood products.

19. The composition of claim 18 wherein the curing agent is present in an amount between about 3 and 7 weight percent, based on the resin solids; and the moderator is present in an amount between 3 and 20 moles per mole of curing agent.

20. A composition for the bonding of composition panel consisting essentially of between about 50 and 60 weight percent aqueous alkali solution of a phenol-formaldehyde resin synthesized from phenol and formaldehyde in a molar ratio of between about 1:1.15 and 1:3 to have a number average molecular weight between about 1000 and 2200 and which has a sodium hydroxide equivalent weight alkalinity of between about 0.5 and 8 weight percent, based on the weight of the composition;

between about 3 and 7 weight percent of a curing agent selected from the group consisting of carboxylic acid esters, lactones, organic carbonates and mixtures thereof; and between about ⅛ and 20 moles per mole of curing agent of a moderator selected from monohydric and polyhydric alcohols soluble in the aqueous alkaline solution.

21. The composition of claim 20 wherein
the curing agent is selected from the group consisting of methyl formate, methyl acetate, ethyl acetate, n-butyl acetate, butylene glycol diacetate, ethylene glycol diacetate, triacetin, gamma-butyrolactone, propylene carbonate and mixtures thereof; and
the moderator is selectred from the group consisting of methanol, ethanol, n-propanol, isopropanol, butanol, ethylene glycol, propylene glycol, glycerine, triglycerol and mixtures thereof.

22. The composition of claim 20 wherein the sodium hydroxide equivalent weight alkalinity is between about 0.7 and 2.0 weight percent, and the mole ratio of moderator to curing agent is between about 1:1 and 20:1.

23. A composition which is essentially free of formaldehyde suitable for the production of cellulosic board upon the application sufficient heat and pressure comprising separate cellulosic components;

an effective amount to serve as a binder for said components of an aqueous alkali solution of a phenol-formaldehyde resin synthesized from phenol and formaldehyde in a molar ratio of between about 1:1.15 and 1:3 to have a number average molecular weight between about 1000 and 2200 and which has a sodium hydroxide equivalent weight alkalinity of between about 0.5 and 8 weight percent, based on the weight of said solution;

between about 1 and 20 weight percent, based on the weight of said solution, of a curing agent selected from the group consisting of carboxylic acid esters, lactones, organic carbonates and mixtures thereof; and between about ⅛ and 20 moles per mole of curing agent of a moderator selected from monohydric and polyhydric alcohols soluble in said aqueous alkali solution.

24. The composition of claim 23 wherein the curing agent content is between about 3 and 7 weight percent, based on the weight of said solution.

25. A composition which is essentially free of formaldehyde suitable for the production of oriented strandboard upon the application of sufficient heat and pressure comprising separate strands of wood suitable for the production of oriented strandboard, between about 3 and 8 weight percent, based on the weight of wood strands, of between 50 and 60 weight percent aqueous alkali solution of a phenol-formaldehyde resin synthesized from phenol and formaldehyde in a molar ratio of between about 1:1.15 and 1:3 to have a number average molecular weight between about 1000 and 2200 and which has a sodium hydroxide equivalent weight alkalinity of between about 0.5 and 8 weight percent, based on the weight of said solution, between about 1 and 20 weight percent, based on the weight of said solution, of a curing agent selected from the group consisting of carboxylic acid esters, lactones, organic carbonates and mixtures thereof; and between about ⅛ and 20 moles per mole of curing agent of a moderator selected from monohydric and polyhydric alcohols soluble in said aqueous alkali solution.

26. The composition of claim 25 wherein the curing agent content is between about 3 and 7 weight percent based on the weight of said solution.

* * * * *